US012670466B2

(12) United States Patent
Kwon et al.

(10) Patent No.: US 12,670,466 B2
(45) Date of Patent: Jun. 30, 2026

(54) CABLE ASSET MANAGEMENT SERVER AND CABLE ASSET MANAGEMENT SYSTEM COMPRISING SAME

(71) Applicant: LS CABLE & SYSTEM LTD., Anyang-si (KR)

(72) Inventors: Jung Ji Kwon, Gumi-si (KR); Jung Nyun Kim, Anyang-si (KR); Seok Hyun Nam, Anyang-si (KR); Hun Chul Yang, Yeonsu-gu (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 371 days.

(21) Appl. No.: 18/030,327

(22) PCT Filed: Oct. 5, 2021

(86) PCT No.: PCT/KR2021/013573
§ 371 (c)(1),
(2) Date: Apr. 5, 2023

(87) PCT Pub. No.: WO2022/080727
PCT Pub. Date: Apr. 21, 2022

(65) Prior Publication Data
US 2024/0020631 A1      Jan. 18, 2024

(30) Foreign Application Priority Data
Oct. 15, 2020      (KR) ........................ 10-2020-0133555

(51) Int. Cl.
G06Q 10/087      (2023.01)
G01K 1/024      (2021.01)
(Continued)

(52) U.S. Cl.
CPC ........... *G06Q 10/087* (2013.01); *G01K 1/024* (2013.01); *G01K 3/005* (2013.01); *G06K 1/121* (2013.01); *G06K 7/1408* (2013.01); *G06Q 50/04* (2013.01)

(58) Field of Classification Search
CPC ...... G06Q 10/087; G06Q 50/04; G06Q 10/20; G06Q 10/06; G06Q 10/08; G06Q 10/10; (Continued)

(56) References Cited

U.S. PATENT DOCUMENTS

2020/0317445 A1*  10/2020  Schultz ................ B65G 1/1371

FOREIGN PATENT DOCUMENTS

JP       2009075644 A      4/2009
KR       20090039134      *  4/2009
(Continued)

OTHER PUBLICATIONS

Raghu Das, RFID Forecasts, Players and Opportunities 2019-2029, IDTechEx Ltd (Year: 2019).*
(Continued)

*Primary Examiner* — Aaron Tutor
(74) *Attorney, Agent, or Firm* — K&L Gates LLP

(57)      ABSTRACT

A cable asset management system comprises: a manufacturer control part for managing data generated in a cable manufacturing process; a distributor control part for managing data generated by the manufacturer control part and data generated in a cable distributing process and a cable constructing process; a user control part for managing data generated by the manufacturer control part and the distributor control part and data generated in a constructed cable; a cable which has a pattern corresponding to a binary code printed on the surface of an outer sheath layer thereof and at which a sensor part for sensing the state of a cable is disposed; and a management server for storing data gener-
(Continued)

10 ated by the manufacturer control part, the distributor control part, and the user control part, and data sensed by the sensor, and generating data about the inventory and lifespan of a cable on the basis of the stored data.

11 Claims, 6 Drawing Sheets

(51) Int. Cl.

| | | |
|---|---|---|
| *G01K 3/00* | (2006.01) | |
| *G06K 1/12* | (2006.01) | |
| *G06K 7/14* | (2006.01) | |
| *G06Q 50/04* | (2012.01) | |

(58) Field of Classification Search
CPC ......... G06Q 10/0875; G06Q 10/06395; G01K 1/024; G01K 3/005; G06K 1/121; G06K 7/1408; Y04S 10/50; G08B 21/18; G08B 21/182
See application file for complete search history.

(56) References Cited

FOREIGN PATENT DOCUMENTS

| | | | | |
|---|---|---|---|---|
| KR | 20090039134 | A | | 4/2009 |
| KR | 20120076463 | | * | 7/2012 |
| KR | 20120076463 | A | | 7/2012 |
| KR | 20140090589 | A | | 7/2014 |
| KR | 20160029441 | A | | 3/2016 |
| KR | 20160141971 | A | | 12/2016 |
| KR | 102063702 | B1 | | 1/2020 |

OTHER PUBLICATIONS

Jeffrey C. Andle, Temperature Monitoring System Using Passive Wireless Sensors for Switchgear and Power Grid Asset Management, Dec. 8, 2010, MNC-CIGRE/CIRED Malaysia, T & D Asset Management Workshop (Year: 2010).*

International Search Report for related International Application No. PCT/KR2021/013573; action dated Jan. 21, 2022; (2 pages).

* cited by examiner

200

Second data input unit — 210

Second data update unit — 220

Second ID management unit — 230

Distributor terminal — 240

400

Power supply unit    410

Sensing unit    420

Wireless communication unit    430

500

CABLE ASSET MANAGEMENT SERVER AND CABLE ASSET MANAGEMENT SYSTEM COMPRISING SAME

CROSS-REFERENCE TO RELATED APPLICATIONS

The present application is a National Stage of International Application No. PCT/KR2021/013573 filed on Oct. 5, 2021, which claims the benefit of Korean Patent Application No. 10-2020-0133555, filed on Oct. 15, 2020, filed with the Korean Intellectual Property Office, the entire contents of which is hereby incorporated by reference.

FIELD

The present invention relates to a cable asset management server and a cable asset management system comprising the same, and more particularly, to a cable asset management server that facilitates stock management and state and lifespan management of cables, and a cable asset management system comprising the same.

BACKGROUND

Cables are important materials that transmit power, and it takes a lot of money to recover a power transmission facility when the power transmission facility fails during an operation of the power transmission facility. Accordingly, a company that transmits power is putting a lot of efforts into maintenance in order to reduce recovery costs when blackout or the like occurs, causing a high cost.

Currently, for maintenance of a cable used for power transmission and reception, a tag-type panel or the like is attached to the cable to write cable information, construction history, and the like in the form of a simple message, and related data is managed in an Excel document or the like.

Accordingly, there is a problem in that currently managed data lacks connectivity of data through a past history, and maintenance efficiency of the cable is degraded because it is not possible to know information on a cable that should be repaired with priority, an inspection that should be performed, start and end points of the cable, and a live or dead cable in a process of establishing a maintenance plan.

Further, a cable distributor has a difficulty in stock management because the cable distributor uses a scheme of manual input to an Excel document for stock management of distributed cables.

SUMMARY

Accordingly, a technical problem of the present invention has been made in view of this respect, and an object of the present invention is to provide a cable asset management server that facilitates management of a cable stock, ascertaining of state information of constructed cables, and lifespan management.

Further, another object of the present invention is to provide a cable asset management system that facilitates management of a cable stock, ascertaining of state information of constructed cables, and lifespan management.

A management server according to an embodiment for achieving the object of the present invention described above stores data generated in a cable manufacturing process, a cable distributing process, and a cable using process after construction, and data sensed by a sensor unit disposed on the cable, and generates data regarding a stock and lifespan of the cable on the basis of the stored data.

In an embodiment of the present invention, the management server may include a data storage unit configured to store the data generated in the cable manufacturing process, the cable distributing process, and the cable using process after construction, and data received from the sensor unit; a stock management unit configured to transmit an alarm to a manufacturer terminal when a stock of each product in a distributor is less than a preset stock amount on the basis of the data stored in the data storage unit; and a cable management unit configured to transmit an alarm to the manufacturer terminal and a user terminal when a temperature of the cable for each product exceeds a preset maximum allowable temperature on the basis of the data stored in the data storage unit.

A cable asset management system according to an embodiment for achieving the object of the present invention described above includes a manufacturer control unit configured to manage data generated in a cable manufacturing process; a distributor control unit configured to manage data generated by the manufacturer control unit and data generated in a cable distributing process and a cable constructing process; a user control unit configured to manage data generated by the manufacturer control unit and the distributor control unit and data generated from a constructed cable; a cable having a pattern corresponding to a binary code printed on a surface of an outer layer, a sensor unit configured to sense a state of the cable being disposed on the cable; and a management server configured to store data generated by the manufacturer control unit, the distributor control unit, and the user control unit and data sensed by the sensor unit, and generate data regarding a stock and lifespan of cables on the basis of the stored data.

In an embodiment of the present invention, the manufacturer control unit may include: a first data input unit configured to input the data generated in the cable manufacturing process; a first data update unit configured to perform update with changed data when there is change in the data input by the first data input unit; a first ID management unit configured to register, delete, and change an ID of the manufacturer control unit; and a manufacturer terminal configured to recognize the pattern corresponding to the binary code printed on the surface of the cable outer layer and read information included in the pattern corresponding to the binary code.

In an embodiment of the present invention, the distributor control unit may include a second data input unit configured to input the data generated in the cable distributing process; a second data update unit configured to perform update with changed data when there is change in the data input by the second data input unit; a second ID management unit configured to register, delete, and change an ID of the distributor control unit; and a distributor terminal configured to recognize the pattern corresponding to the binary code printed on the surface of the cable outer layer and read information included in the pattern corresponding to the binary code.

In an embodiment of the present invention, the user control unit may include a third data input unit configured to input data generated on the spot during use of a cable of which construction is completed; a third data update unit configured to perform update with changed data when there is change in data input by the third data input unit; a third ID management unit configured to register, delete, and change an ID of the user control unit; and a user terminal configured to recognize the pattern corresponding to the binary code

3 printed on the surface of the cable outer layer and read information included in the pattern corresponding to the binary code.

In an embodiment of the present invention, the sensor unit disposed on the cable may include a power supply unit configured to generate power using a magnetic field generated from the cable; a sensing unit configured to sense a state of the cable using the power generated by the power supply unit; and a wireless communication unit configured to transmit data sensed by the sensing unit using the power generated by the power supply unit.

In an embodiment of the present invention, the management server may include a data storage unit configured to store data input by the manufacturer control unit, the distributor control unit, and the user control unit and data received from the sensor unit; a stock management unit configured to transmit an alarm to the manufacturer control unit when a stock of each product in a distributor is less than a preset stock amount on the basis of the data stored in the data storage unit; and a cable management unit configured to transmit an alarm to the manufacturer control unit and the user control unit when a temperature of the cable exceeds a preset temperature on the basis of the data stored in the data storage unit.

In an embodiment of the present invention, the stock management unit may calculate a maximum stock amount and a current stock amount of each product in the distributor input by the distributor control unit to calculate a current stock rate of the distributor, compare the calculated current stock rate of the distributor with a minimum stock rate for each product in the distributor input by the manufacturer control unit, and transmit an alarm to the manufacturer control unit when the current stock rate of the distributor is less than the minimum stock rate input by the manufacturer control unit.

In an embodiment of the present invention, the cable management unit may select a maximum allowable temperature of the cable among maximum allowable temperatures of respective cables input by the manufacturer control unit, compares the maximum allowable temperature of the selected cable with a current temperature of the cable sensed by the sensor unit disposed on the cable, and transmit an alarm to the manufacturer control unit and the user control unit when the current temperature of the cable exceeds the maximum allowable temperature input by the manufacturer control unit.

According to the present invention, the cable asset management system receives data generated in a use stage after manufacturing, distribution, and construction of a cable, and prints a pattern corresponding to a binary code corresponding to the data on the cable. This makes it possible for a manufacturer, a distributor, and a user to continuously manage information on the cable from a past history without creating a separate document.

Further, when it is necessary to change information related to a cable, changed information can be additionally input or input information can be corrected, thereby facilitating management of the cable.

Further, information generated in a cable managing process is input in real time so that no missing of information occurs, making it possible to prevent accidents from occurring due to failing in ascertaining whether a cable is incorrectly connected or is live on the spot, for example.

Further, since it is possible to check a current cable stock amount of the distributor in real time, the manufacturer can actively supply additional cables to the distributor when the distributor does not have a sufficient amount in cable stock, and can establish a cable manufacturing and supplying plan. This makes it possible for the distributor to remove distribution anxiety due to cable stock shortage, and for the manufacturer to eliminate a work loss that the stock in the distributor should be ascertained one by one.

Further, the sensor unit disposed on the cable can ascertain a current state of the cable and transmit an alarm when an abnormality occurs. This makes it possible to ascertain a real-time state of the cable and take an immediate action.

DETAILED DESCRIPTION

The present invention can be variously changed and can have various forms, and embodiments will be described in detail herein. However, this is not intended to limit the present invention to a specific disclosed form, and it should be understood that the present invention includes all changes, equivalents, and substitutes included in the spirit and scope of the present invention. Like reference signs have been used for like components throughout description of each figure. Terms such as first and second may be used to describe various components, but the components should not be limited by the terms.

The terms are only used for the purpose of distinguishing one component from other components. Further, terms used herein are only used to describe specific embodiments, and are not intended to limit the present invention. Singular expressions include plural expressions unless the context clearly dictates otherwise.

It should be understood that the terms "include" or "configured of" used therein are intended to designate that there is a feature, number, step, operation, component, part, or combination thereof described herein, and does not preclude the presence or addition of one or more other features, numbers, steps, operations, components, parts, or combinations thereof.

Unless otherwise defined, all terms used herein, including technical or scientific terms, have the same meaning as commonly understood by those skilled in the art to which the present disclosure belongs. Terms such as those defined in commonly used dictionaries should be construed as having meanings consistent with their meaning in the context of the relevant art and will not be construed as having idealized or overly formal meanings unless expressly defined herein.

Hereinafter, preferred embodiments of the present invention will be described in greater detail with reference to the drawings.

Figure 1:
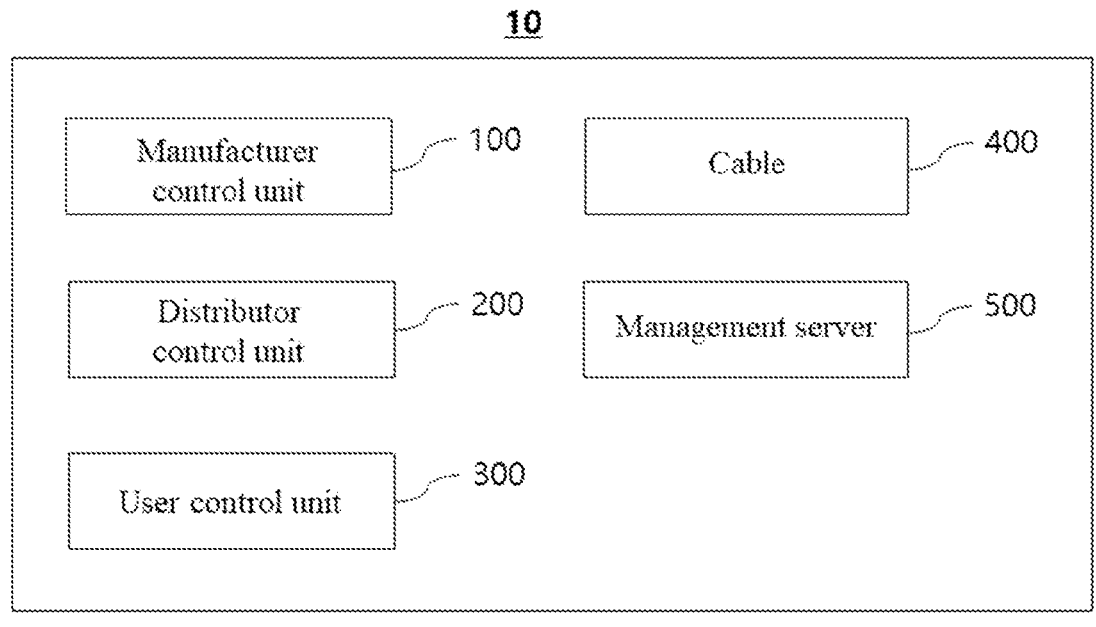
FIG. 1 is a block diagram illustrating a cable asset management system according to an embodiment of the present invention.

FIG. 1 is a block diagram illustrating a cable asset management system according to an embodiment of the present invention.

Referring to FIG. 1, an IOT-based cable management system 10 according to an embodiment of the present invention includes a manufacturer control unit 100, a distributor control unit 200, a user control unit 300, a cable 400, and a management server 500.

The manufacturer control unit 100 may manage data generated in a manufacturing process of the cable. The manufacturer control unit 100 may input information such as a product specification (product name, structure, voltage, capacity, gross weight, material code, standard, quantity, color, certification details, allowable current table, electrical constant, test result, maximum allowable temperature, lot number, manufacturing date, and the like), a minimum stock rate of each product in each distributor, a product test report, contact information for a salesperson in charge, and precautions and notifications in use of the product. The information input by the manufacturer control unit 100 may be reconstructed into a pattern corresponding to binary code representing the information, and patterns corresponding to the binary codes may be printed on a surface of the cable 400. Data included in the patterns corresponding to the binary codes may be stored in the management server 500, and the manufacturer control unit 100 may also perform data correction when there is change in the data included in the patterns corresponding to the binary codes.

The distributor control unit 200 can manage data that is generated in a cable distributing process. The distributor control unit 200 can input information such as transportation information, abnormality of a product, date of arrival, date of shipment, supplier, a used length and remaining length of a cable wound on a drum, position information of each product stored in a warehouse, a maximum stock amount of each product in the distributor, and a current stock amount of each product in the distributor. The information input by the distributor control unit 200 may be reconstructed into patterns corresponding to binary codes corresponding to the information, and the patterns corresponding to the binary codes may be printed on the surface of the cable 400. Data included in the patterns corresponding to the binary codes may be stored in the management server 500, and the distributor control unit 200 may also perform data correction when there is change in the data included in the patterns corresponding to the binary codes.

The user control unit 300 can manage constructed cables on the spot and manage data generated on the spot. The user control unit 300 may input information such as a cable name, a live cable/connected cable, a temperature value, a load current value, an insulation resistance value, a very low frequency (VLF) tan delta value, a partial discharge (PD) value, a tangent delta value, a harmonic value, a system diagram, a cable length, an emergency contact network of cable managers, or special matters during an operation of a constructed cable such as a cable management history and a cable accident and recovery history, for cable management and maintenance. The information input by the user control unit 300 may be reconstructed into patterns corresponding to binary codes corresponding to the information, and the patterns corresponding to the binary codes may be printed on the surface of the cable 400. Data included in the patterns corresponding to the binary codes may be stored in the management server 500, and the user control unit 300 may also perform data correction when there is change in the data included in the patterns corresponding to the binary codes.

The pattern corresponding to the binary code may be printed on the surface of the cable 400 in a producing process. The information input by the manufacturer control unit 100 in the producing process may be reconstructed into a pattern according to a binary code corresponding thereto and printed on the surface of the cable 400, and then, information generated in the distributing process may be input by the distributor control unit 200, and information input by the user control unit 300 in a process of using the cable on the spot after construction may be added.

The management server 500 receives and stores updated information input from the manufacturer control unit 100, the distributor control unit 200, and the user control unit 300, and receives and stores data sensed by the sensor unit of the cable 400. The information stored in the management server 500 can be used for cable stock management of each distributor and management of a state and lifespan of constructed cables.

Figure 2:
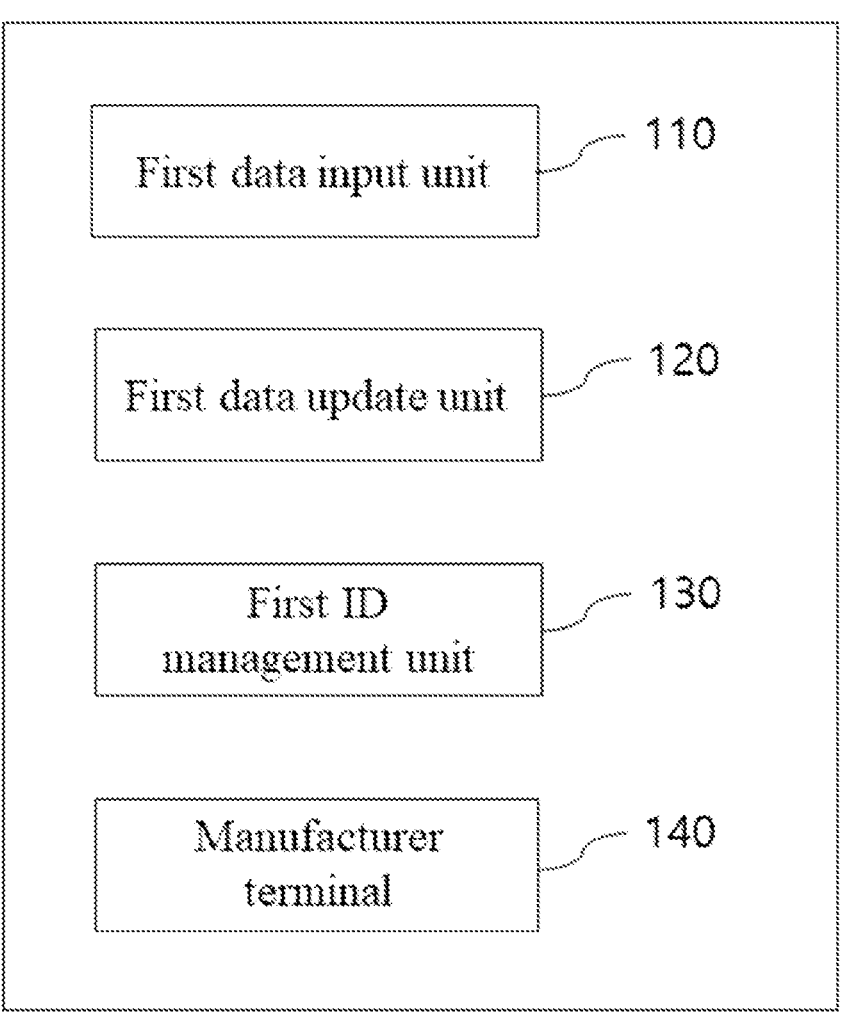
FIG. 2 is a block diagram illustrating a manufacturer control unit of the cable asset management system according to the embodiment of the present invention.

FIG. 2 is a block diagram illustrating the manufacturer control unit of the cable asset management system according to the embodiment of the present invention.

Referring to FIG. 2, the manufacturer control unit 100 of the cable asset management system 10 according to the embodiment of the present invention includes a first data input unit 110, a first data update unit 120, and a first ID management unit 130, and a manufacturer terminal 140.

The first data input unit 110 may input information generated in a manufacturing process. For example, the information initially generated in the manufacturing process may be information such as a product specification (product name, structure, voltage, capacity, gross weight, material code, standard, quantity, color, certification details, allowable current table, electrical constant, test result, maximum allowable temperature, lot number, manufacturing date, and the like), a minimum stock rate of each product in each distributor, a product test report, contact information for a salesperson in charge, and precautions and notifications in use of the product. Thereafter, when information needs to be changed with the information input by the distributor control unit 200 and the user control unit 300, or when information on a product or personnel needs to be changed in the manufacturing process, additional information can be input.

The first data update unit 120 may update data related to information changed after initial information input when there is the information changed after initial information input. For example, when there is change in product specification or personnel in charge in the manufacturing process, the first data update unit 120 may receive changed information from the management server 500 and perform update. Further, when distribution information including a stock amount of cables that are products is input, the distributor control unit 200 may receive the distribution information, which is transferred to the management server 500, and the first data update unit 120 may receive newly input information from the management server 500 and perform data update with the information. Further, when the information such as the live cable/connected cable, the temperature value, the load current value, the insulation resistance value, the very low frequency (VLF) tan delta value, the partial discharge (PD) value, the tangent delta value, the harmonic value, the system diagram, and the cable length of the cable, the emergency contact network of cable managers, or the special matters during an operation of a constructed cable such as a cable management history and a cable accident and recovery history is input in a use stage after construction, the user control unit 300 receives the information, which is transferred to the management server 500, and the first data update unit 120 may receive newly input information from the management server 500 and perform update with the information.

The first ID management unit 130 may manage an ID of the manufacturer control unit 100. The first ID management unit 130 can perform management such as registration, deletion, and change of the ID of the manufacturer control unit 100. The first ID management unit 130 may manage an ID of an employee in charge of inputting information in the manufacturer control unit 100, and separately manage the information input by the manufacturer control unit 100 and information input in another area, that is, the distributor control unit 200 and the user control unit 300. This makes it possible to manage input information by area.

The manufacturer terminal 140 can recognize the pattern corresponding to the binary code printed on the surface of the cable 400 and read information included in the pattern corresponding to the binary code. The manufacturer terminal 140 may include a camera capable of recognizing the pattern corresponding to the binary code and a dedicated application capable of reading the information included in the pattern corresponding to the binary code. Further, the manufacturer terminal 140 may transmit information input to the pattern corresponding to the binary code and updated information to the management server 500.

However, the present invention is not limited thereto, and the manufacturer terminal 140 may be configured of a separate terminal in which a dedicated reader and a dedicated application capable of recognizing the pattern corresponding to the binary code are implemented, and the dedicated application may be configured of a mobile application or web.

Figure 3:
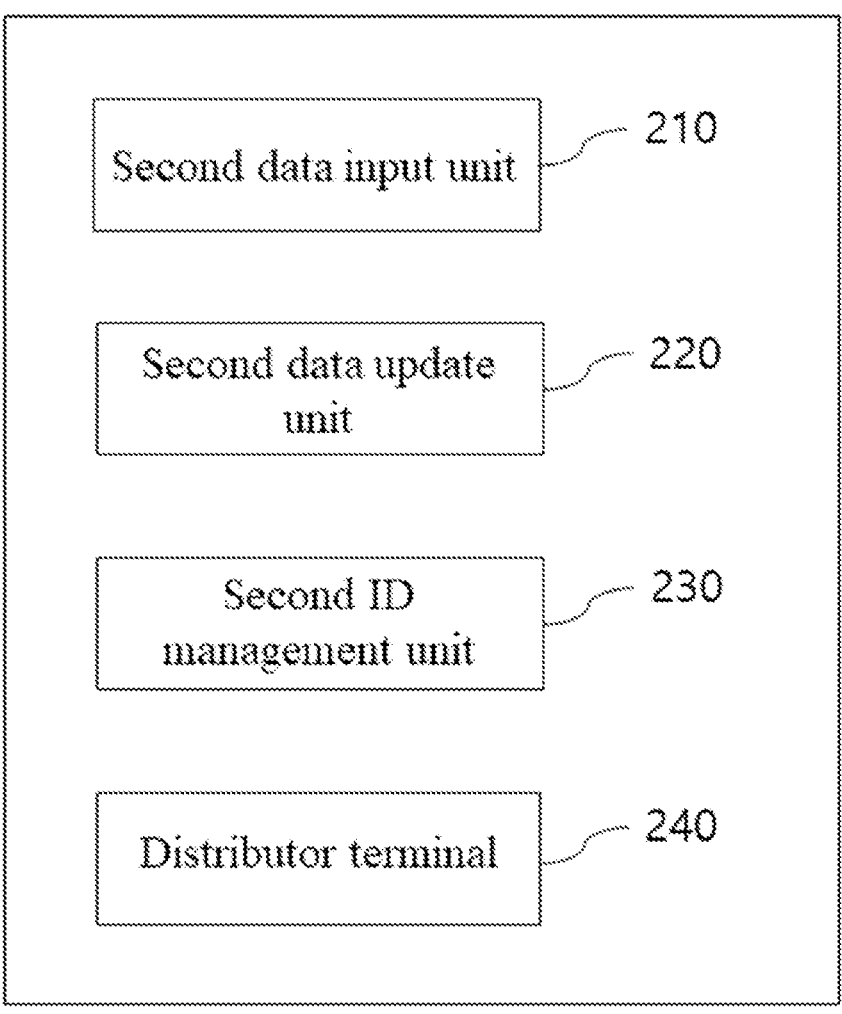
FIG. 3 is a block diagram illustrating a distributor control unit of the cable asset management system according to the embodiment of the present invention.

FIG. 3 is a block diagram illustrating the distributor control unit of the cable asset management system according to the embodiment of the present invention.

Referring to FIG. 3, the distributor control unit 200 of the cable asset management system 10 according to an embodiment of the present invention may include a second data input unit 210, a second data update unit 220, and a second ID management unit 230, and a distributor terminal 240. The second data input unit 210 may input information generated in the cable distributing process. For example, information that is initially generated in the cable distributing process may be information such as transportation information, abnormality of a product, date of arrival, position information of each product stored in a warehouse, and a system diagram (length of cable or the like), a maximum stock amount and current stock amount of each product in a distributor. Thereafter, when information needs to be changed with the information input by the manufacturer control unit 100 and the user control unit 300, or when information on distribution, a stock amount, or the like needs to be changed in the distributing process, additional information can be input.

The second data update unit 220 may update data related to information changed after initial information input when there is the information changed after initial information input. For example, the second data update unit 220 may receive changed information and perform update when, in the distributing process, there is change in a distribution route, position information of each product stored in the warehouse, date of shipment, supplier, used length and remaining length of a cable wound on a drum, a maximum stock amount and current stock amount of each product in a distributor, and personnel in charge. Further, when changed information on a product specification or manufacturing personnel in charge is input, the manufacturer control unit 100 may receive the changed information, which is transferred to the management server 500, and the second data update unit 220 may receive newly input information from the management server 500 and perform data update with the information. Further, when the information such as the live cable/connected cable, the temperature value, the load current value, the insulation resistance value, the very low frequency (VLF) tan delta value, the partial discharge (PD) value, the tangent delta value, the harmonic value, the system diagram, and the cable length of the cable, the emergency contact network of cable managers, or the special matters during an operation of a constructed cable such as a cable management history and a cable accident and recovery history is input in the use stage after construction, the user control unit 300 may receive the information, which is transmitted to the management server 500, and the second data update unit 220 may receive newly input information from the management server 500 and perform data update with the information. The second ID management unit 230 may manage an ID of the distributor control unit 200. The second ID management unit 230 can perform management such as registration, deletion, and change of the ID of the distributor control unit 200. The second ID management unit 230 may manage an ID of an employee in charge of inputting information in the distributor control unit 200, and separately manage the information input by the distributor control unit 200 and information input in another area, that is, the manufacturer control unit 100 and the user control unit 300. This makes it possible to manage input information by area.

The distributor terminal 240 can recognize the pattern corresponding to the binary code printed on the surface of the cable 400 and read the information included in the pattern corresponding to the binary code. The distributor terminal 240 may include a camera capable of recognizing the pattern corresponding to the binary code and a dedicated application capable of reading the information included in the pattern corresponding to the binary code. Further, the distributor terminal may transmit information input to the pattern corresponding to the binary code and updated information to the management server 500.

However, the present invention is not limited thereto, and the distributor terminal 240 may be configured of a separate terminal in which a dedicated reader and a dedicated application capable of recognizing the pattern corresponding to the binary code are implemented, and the dedicated application may be configured of a mobile application or web.

Figure 4:
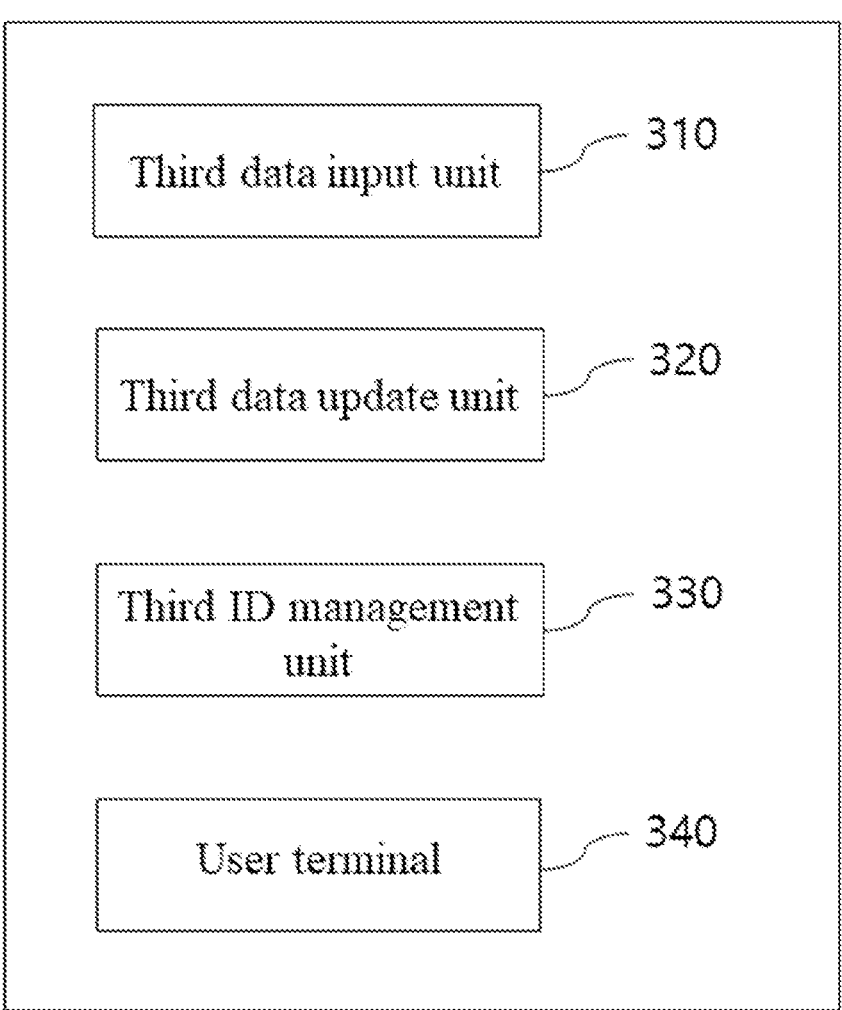
FIG. 4 is a block diagram illustrating a user control unit of the cable asset management system according to the embodiment of the present invention.

FIG. 4 is a block diagram illustrating the user control unit of the cable asset management system according to an embodiment of the present invention.

Referring to FIG. 4, the user control unit 300 of the cable asset management system 10 according to the embodiment of the present invention includes a third data input unit 310, a third data update unit 320, a third ID management unit 330, and a user terminal 340. The third data input unit 310 may input information generated on the spot when a cable of which the construction is completed is being used. For example, information initially generated on the spot during use of the cable of which the construction is completed may be the information such as the live cable/connected cable, the temperature value, the load current value, the insulation resistance value, the very low frequency (VLF) tan delta value, the partial discharge (PD) value, the tangent delta value, the harmonic value, the system diagram, and the cable length of the cable, the emergency contact network of cable managers, or the special matters during an operation of a constructed cable such as a cable management history and the cable accident and recovery history. Thereafter, when information needs to be changed with the information input by the manufacturer control unit 100 and the distributor control unit 200, or when information on a situation newly occurring on the spot or information on personnel needs to be changed, additional information can be input.

The third data update unit 320 may update data related to information changed after initial information input when there is the information changed after initial information input. For example, when there is change in a distribution route, a current stock, or personnel in charge in the distributing process, the third data update unit 320 may receive changed information and perform update. Further, when changed information of a product specification or manufacturing personnel is input, the manufacturer control unit 100 may receive the changed information, which is transferred to the management server 500, and the third data update unit 320 may receive newly input information from the management server 500 and perform update with the information. Further, when distribution information and a current stock amount of a product are input, the distributor control unit 200 receives the distribution information and the current stock amount, which is transferred to the management server 500, and the third data update unit 320 may receive newly input information from the management server 500 and perform update with the information.

The third ID management unit 330 may manage an ID of the user control unit 300. The third ID management unit 330 may perform management such as registration, deletion, and change of the ID of the user control unit 300. The third ID management unit 330 may manage the ID of an employee in charge of inputting information in the user control unit 300, and separately manage the information input by the user control unit 300 and information input in another area, that is, the manufacturer control unit 100 and the distributor control unit 200. This makes it possible to manage input information by area.

The user terminal 340 can recognize the pattern corresponding to the binary code printed on the surface of the cable 400 and read the information included in the pattern corresponding to the binary code. The user terminal 340 may include a camera capable of recognizing the pattern corresponding to the binary code and a dedicated application capable of reading the information included in the pattern corresponding to the binary code. Further, the user terminal 340 may transmit Information input to the pattern corresponding to the binary code and updated information to the management server 500.

However, the present invention is not limited thereto, and the user terminal 340 may be configured of a separate terminal in which a dedicated reader and a dedicated application capable of recognizing the pattern corresponding to the binary code are implemented, and the dedicated application may be configured of a mobile application or web.

Figure 5:
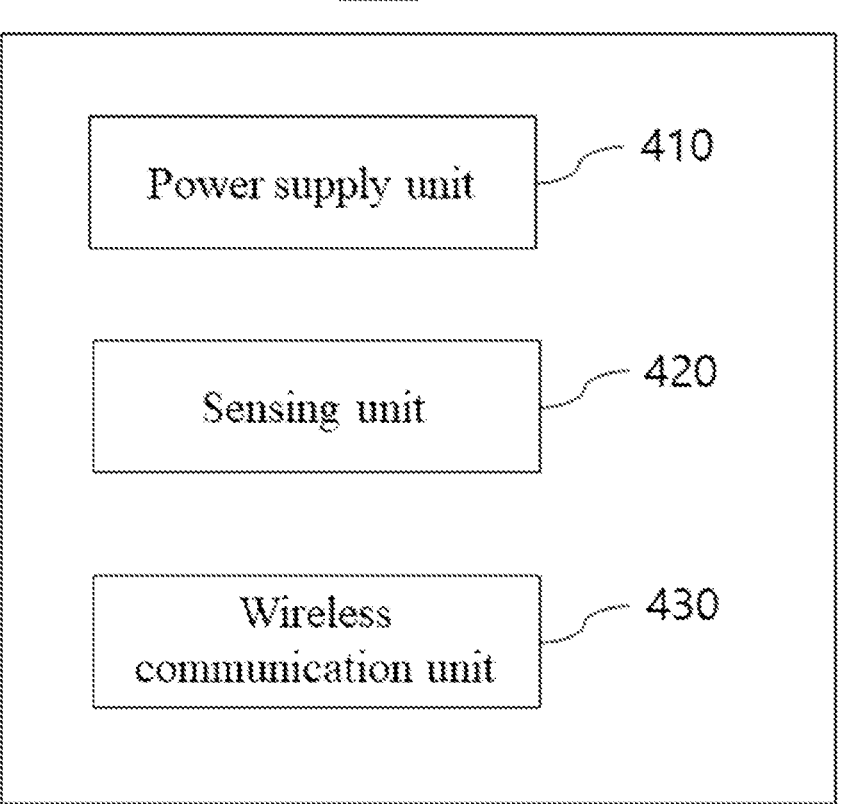
FIG. 5 is a block diagram illustrating a cable of the cable asset management system according to the embodiment of the present invention.

FIG. 5 is a block diagram illustrating a cable of the cable asset management system according to the embodiment of the present invention.

Referring to FIG. 5, in the cable of the cable asset management system according to the embodiment of the present invention, a pattern shape corresponding to a binary code representing information on a manufacturing process and distributing process of the cable, and the constructed cable stored in the management server may be printed on a surface of the cable, and a sensor unit that senses a state of the cable may be disposed.

The pattern corresponding to the binary code provided on an outer layer of the cable 400 may have various forms. For example, the pattern corresponding to the binary code may be a dot pattern or a data matrix. The pattern corresponding to the binary code provided on the outer layer of the cable 400 may be printed in a cable manufacturing process. The cable manufacturing process may be carried out as a continuous manufacturing process in which the cable is produced and then wound around a drum, and the pattern corresponding to the binary code may be printed on the surface of the cable before the cable is wound around the drum.

The sensor unit may include a power supply unit 410, a sensing unit 420 and a wireless communication unit 430. The sensor unit may be disposed between a conductor layer and the outer layer of the cable.

The power supply unit 410 may generate power using an energy harvesting technology. A magnetic field may be generated when a current flows through the cable, and the power supply unit 410 may convert the magnetic field into electric energy to supply power to the sensing unit 420 and the wireless communication unit.

The sensing unit 420 may sense a state of the cable using the power generated by the power supply unit 410. For example, the sensing unit 420 may sense a state such as a temperature value, a load current value, an insulation resistance value, a very low frequency (VLF) tan delta value, a partial discharge (PD) value, a tangent delta value, or a harmonic value of the cable. The wireless communication unit 430 may transmit data sensed by the sensing unit 420 using the power generated by the power supply unit 410. The data transmitted by the wireless communication unit 430 may be transmitted to the management server 500 and stored in a data storage unit 510 of the management server 500. The management server 500 can check a real-time state of the cable using the data transmitted by the wireless communication unit 430, and transmit an alarm to the manufacturer control unit 100 and the user control unit 300 when an abnormality occurs in the cable, so that real-time management of the cable can be performed.

Figure 6:
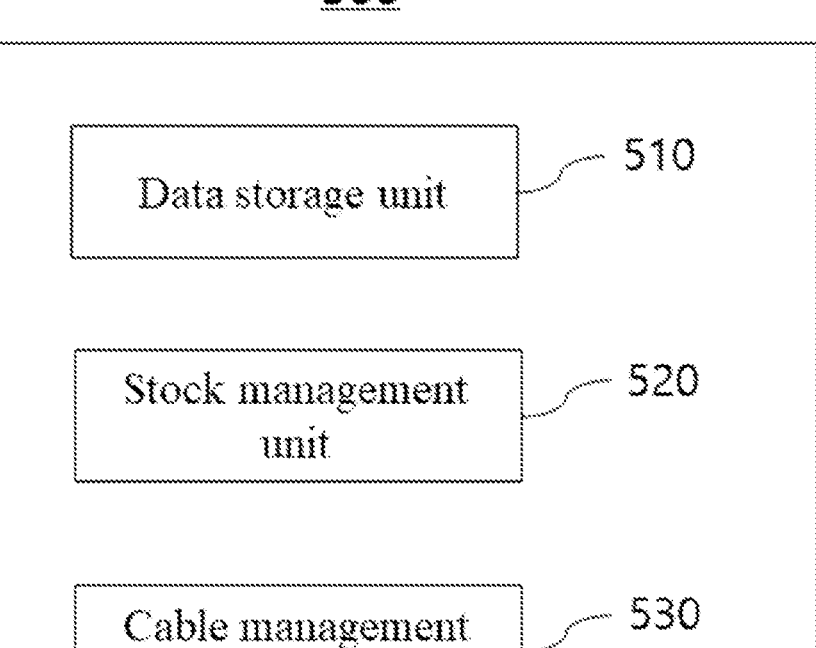
FIG. 6 is a block diagram illustrating a management server of the cable asset management system according to the embodiment of the present invention.

FIG. 6 is a block diagram illustrating the management server of the cable asset management system according to the embodiment of the present invention.

Referring to FIG. 6, the management server 500 of the cable asset management system according to the embodiment of the present invention may include the data storage unit 510, a stock management unit 520, and a cable management unit 530.

The data storage unit 510 may store data input by the manufacturer control unit 100, the distributor control unit 200, and the user control unit 300, and data received from the sensor unit of the cable 400.

The manufacturer control unit 100 may set and input the minimum stock rate of each product in each distributor. There may be a plurality of cable distributors, and stock amounts and minimum stock rates of the respective distributors may be set differently since the distributors have different processing capacities. The manufacturer control unit 100 may set and input a minimum stock rate according to a situation of each distributor, and input data may be transmitted to and stored in the data storage unit 510.

The distributor control unit 200 may input a maximum stock amount and a current stock amount of each product of each distributor. The maximum stock amount and the current stock amount input by the distributor control unit 200 may be transmitted to the data storage unit 510 and stored therein. Cable stock data input by the manufacturer control unit 100 and the distributor control unit 200 may be used for stock management of manufacturers and distributors.

Further, the manufacturer control unit 100 may input a maximum allowable temperature of each cable. There are various types of cables manufactured by manufacturers, and each cable may have a different maximum allowable temperature according to a specification. Data regarding the maximum allowable temperature of each cable input by the manufacturer control unit 100 may be used for management of a current state of the cable.

The stock management unit 520 may transmit an alarm to the manufacturer control unit 100 when the stock held by the distributor is less than a preset stock amount on the basis of the data stored in the data storage unit 510.

For example, the stock management unit 520 may calculate the maximum stock amount and the current stock amount of the distributor input by the distributor control unit 200 to calculate a current stock rate of the distributor, compare the calculated current stock rate of the distributor with the minimum stock rate in each distributor input by the manufacturer control unit 100, and transmit an alarm to the manufacturer control unit when the current stock rate of the distributor is less than the minimum stock rate input by the manufacturer control unit. The manufacturer control unit 100 receiving the alarm may recognize a state in which the distributor does not have a sufficient stock, and additionally supply cables.

The cable management unit 530 may transmit an alarm to the manufacturer control unit 100 and the user control unit 300 when the state of the cable differs from a preset value on the basis of the data stored in the data storage unit 510.

For example, when the temperature of the cable exceeds a preset temperature on the basis of the data stored in the data storage unit 510, the cable management unit 530 may transmit an alarm to the manufacturer control unit and the user control unit. The cable management unit 530 may select the maximum allowable temperature of the relevant cable among the maximum allowable temperatures of the respective cables input by the manufacturer control unit 100, compare the maximum allowable temperature of the selected cable with a current temperature of the cable sensed by the sensor unit disposed on the cable, and transmit an alarm to the manufacturer control unit 100 and the user control unit 300 when the current temperature of the cable exceeds the maximum allowable temperature input by the manufacturer control unit 100.

However, the present invention is not limited thereto, and an alarm may be transmitted to the manufacturer control unit 100 and the user control unit 300 when there is a difference between a preset value of a load current value, insulation resistance value, very low frequency (VLF) tan delta value, partial discharge (PD) value, tangent delta value, or harmonic value and a current sensed value of the load current value, insulation resistance value, very low frequency (VLF) tan delta value, partial discharge (PD) value, tangent delta value, and harmonic value of the cable, in addition to the temperature value of the cable. Although the present invention has been described above with reference to the embodiments, it will be understood by those skilled in the art that the present invention can variously modified and changed without departing from the spirit and scope of the present invention described in the claims below.

The invention claimed is:

1. A cable asset management system comprising:

a manufacturer control unit configured to manage data generated in a cable manufacturing process, set a minimum stock rate of each cable of each distributor, and input a maximum allowable temperature of each cable;

a distributor control unit configured to manage data generated by the manufacturer control unit and data generated in a cable distributing process and a cable constructing process;

a user control unit configured to manage data generated by the manufacturer control unit and the distributor control unit and data generated from a constructed cable;

a cable having a pattern corresponding to a binary code printed on a surface of a cable outer layer during a cable manufacturing process prior to winding the cable around a drum;

a sensor unit configured to sense a state of the cable being disposed on the cable; and a management server configured to store data generated by the manufacturer control unit, the distributor control unit, and the user control unit and data sensed by a sensor unit, and generate data regarding a stock and lifespan of cables based on the stored data, wherein the sensor unit disposed on the cable comprises:

a power supply unit configured to generate power using a magnetic field generated from the cable based on an energy harvesting technology;

a sensing unit configured to sense a temperature value, a load current value, and at least one value selected from the group consisting of:

an insulation resistance value, a very low frequency (VLF) tan delta value, a partial discharge (PD) value, a tangent delta value, and a harmonic value of the cable using power generated by the power supply unit; and a wireless communication unit configured to transmit the data sensed by the sensing unit using the power generated by the power supply unit, wherein the sensor unit is disposed between a conductor layer and the outer layer of the cable, wherein the distributor control unit is configured to input a maximum stock amount and a current stock amount of each cable for each distributor, wherein the management server comprises:

a data storage unit configured to store data input by the manufacturer control unit, the distributor control unit, and the user control unit and data received from the sensor unit;

a stock management unit configured to transmit a first alarm to the manufacturer control unit when a stock of each product in a given distributor is less than a preset stock amount based on the data stored in the data storage unit; and a cable management unit configured to transmit a second alarm to the manufacturer control unit and the user control unit when a temperature of the cable exceeds a preset temperature based on the data stored in the data storage unit, wherein the cable management unit is configured to transmit a third alarm to the manufacturer control unit and the user control unit when a state value of the cable including at least one of the insulation resistance value, the VLF tan delta value, the tangent delta value, and the harmonic value deviates from a preset value.

2. The cable asset management system of claim 1, wherein the manufacturer control unit includes:

a first data input unit configured to input the data generated in the cable manufacturing process;

a first data update unit configured to perform update with changed data when there is change in the data input by the first data input unit;

a first ID management unit configured to register, delete, and change an ID of the manufacturer control unit; and a manufacturer terminal configured to recognize the pattern corresponding to the binary code printed on the surface of the cable outer layer and read information included in the pattern corresponding to the binary code.

3. The cable asset management system of claim 1, wherein the distributor control unit includes a second data input unit configured to input the data generated in the cable distributing process;

a second data update unit configured to perform update with changed data when there is change in the data input by the second data input unit;

a second ID management unit configured to register, delete, and change an ID of the distributor control unit; and a distributor terminal configured to recognize the pattern corresponding to the binary code printed on the surface of the cable outer layer and read information included in the pattern corresponding to the binary code.

4. The cable asset management system of claim 1, wherein the user control unit includes a third data input unit configured to input data generated at a location of use during use of a cable of which construction is completed;

a third data update unit configured to perform update with changed data when there is change in data input by the third data input unit;

a third ID management unit configured to register, delete, and change an ID of the user control unit; and a user terminal configured to recognize the pattern corresponding to the binary code printed on the surface of the cable outer layer and read information included in the pattern corresponding to the binary code.

5. The cable asset management system of claim 1, wherein the stock management unit calculates a maximum stock amount and a current stock amount of each product in the distributor input by the distributor control unit to calculate a current stock rate of the distributor, compares the calculated current stock rate of the distributor with a minimum stock rate for each product in the distributor input by the manufacturer control unit, and transmit an alarm to the manufacturer control unit when the current stock rate of the distributor is less than the minimum stock rate input by the manufacturer control unit.

6. The cable asset management system of claim 1, wherein the cable management unit selects a maximum allowable temperature of the cable among maximum allowable temperatures of respective cables input by the manufacturer control unit, compares the maximum allowable temperature of the selected cable with a current temperature of the cable sensed by the sensor unit disposed on the cable, and transmits an alarm to the manufacturer control unit and the user control unit when the current temperature of the cable exceeds the maximum allowable temperature input by the manufacturer control unit.

7. The cable asset management system of claim 1, wherein the at least one value selected from the group includes the insulation resistance value and at least a second value selected from the group consisting of:

the insulation resistance value,
the VLF tan delta value,
the PD value,
the tangent delta value, and
the harmonic value of the cable using power generated by the power supply unit.

8. The cable asset management system of claim 1, wherein the at least one value selected from the group includes the VLF tan delta value, and at least a second value selected from the group consisting of:

the insulation resistance value,
the VLF tan delta value,
the PD value,
the tangent delta value, and
the harmonic value of the cable using power generated by the power supply unit.

9. The cable asset management system of claim 1, wherein the at least one value selected from the group includes the PD value and at least a second value selected from the group consisting of:

the insulation resistance value,
the VLF tan delta value,
the PD value,
the tangent delta value, and
the harmonic value of the cable using power generated by the power supply unit.

10. The cable asset management system of claim 1, wherein the at least one value selected from the group includes the tangent delta value and at least a second value selected from the group consisting of:

the insulation resistance value,
the VLF tan delta value,
the PD value,
the tangent delta value, and
the harmonic value of the cable using power generated by the power supply unit.

11. The cable asset management system of claim 1, wherein the at least one value selected from the group includes the harmonic value of the cable using power generated by the power supply unit, and at least a second value selected from the group consisting of:

the insulation resistance value,
the VLF tan delta value,
the PD value,
the tangent delta value, and
the harmonic value of the cable using power generated by the power supply unit.

* * * * *